UNITED STATES PATENT OFFICE.

WILLIAM ROBINSON, OF CHICAGO, ILLINOIS.

METHOD OF CRYSTALLIZING GRAPE-SUGAR.

SPECIFICATION forming part of Letters Patent No. 270,699, dated January 16, 1883.

Application filed June 26, 1882. (Specimens.)

*To all whom it may concern:*

Be it known that I, WILLIAM ROBINSON, of the city of Chicago, in the county of Cook and State of Illinois, have invented certain new and useful Improvements in Methods of Crystallizing Grape-Sugar; and I do hereby declare that the following is a full, clear, and exact description thereof.

In the manufacture of sugar from starch the product has heretofore been found to possess certain characteristics and tendencies, among which are the following: The solid mass consists of crystallizable but to a greater or less degree uncrystallized grape-sugar, non-crystallizable grape-sugar, dextrine, cellulose, gluten, and soluble impurities. The portion of sugar contained in this mass and capable of crystallization is, in the method of manufacture heretofore practiced, prevented from crystallizing by the presence of the remaining uncrystallizable parts. By reason of the presence of the remaining substances, also, the mass, after standing, has a tendency to grow dark in color, has usually a bitter or otherwise objectionable taste, and it is not susceptible of granulation to the extent which is desired for commercial and other purposes.

My invention has for its object to separate the crystallizable sugar from the remainder of the mass, and in doing so to effect the crystallization as well as the purification of the former; and to this end the invention consists in the treatment of the unpurified sugar or sirup in the manner substantially as follows—that is to say:

In the treatment of previously-solidified grape-sugar according to my invention, I first melt the same, and either before or after melting, but preferably before, add thereto a quantity of water, so as to produce a dilute watery solution, or, more properly, an emulsion. The amount of water necessary to be added will vary with the temperature of the water or of the place in which the crystallization is to be effected, and also according to the quality or purity of the sugar to be treated. In treating an ordinarily-available quality of sugar in the summer the quantity of water to be added will never fall below about five per cent., or in winter about ten per cent., by weight, of the sugar to be treated. The melting process is preferably arrested before the particles or crystals of sugar are dissolved, or while the liquid is simply translucent and not yet transparent. In this condition the liquid is poured into vats or suitable receptacles to cool and crystallize. The water has less affinity for the crystallizable sugar than for that which is uncrystallizable, and also less than for the gluten, the cellulose, and the soluble impurities, the latter consisting usually of remnants of acids or other substances employed in the production of the sugar. After standing in an ordinarily-available atmospheric temperature long enough to cool, crystallization begins, and the water thus present in excess allows the necessary movements of the particles which seek to unite in crystalline form. When the mass has stood long enough for the crystallization to be effected the liquid portion, consisting of the water added, as stated, and the substances taken up thereby, may be removed or drained off in any suitable manner, leaving a mass of crystallized sugar destitute of disagreeable taste, calculated to retain its color, and susceptible of being granulated by crushing. The residuum withdrawn with the water solidifies, but does not crystallize. In the case of sugar of very impure quality, an addition of as much as twenty per cent. of water may be found necessary to properly effect purification and crystallization, making, say, thirty-five to forty per cent. of water present in the mass when ready to be set aside.

The presence of the excess of water in the mass prepared for crystallization, as above set forth, forms properly an emulsion, and not only facilitates the movements of crystallization, but also prevents the mass from becoming viscous irrespective of temperature. It is not therefore required in crystallizing from the emulsion, as it is from a concentrated solution, that a high temperature be maintained. All that appears to be requisite is that the temperature be such that the emulsion may remain liquid, not necessarily melted. As fluidity will depend upon the quantity of water present in the mass, it is evident that any temperature above freezing may be employed, observing that the lower the temperature the more water is required. I prefer a temperature of about 40° to 60°; but for economy the prevailing temperature of the atmosphere may be utilized by selecting or arranging a cool spot in summer and an availably warm spot in winter for the exposure of the article. In the method described by forming a watery emulsion, as set forth, crystallization may be successfully achieved in a temperature ranging from 32° to 80° Fahrenheit. The product of this method is not strictly "anhydrous," but is found to contain, say, 4.65 per cent. of water.

From a fair quality of grape-sugar before purification a crystallized mass may be obtained by the method described, equal in weight to from seventy-five to ninety per cent. of the original. The residuum will be composed of the remainder in weight with the water added.

Applying my method to the treatment of the grape-sugar before its solidification, I begin therewith after the boiling has been completed and when the mass is at a temperature below the boiling-point of water. In this condition water is added as above described, the same being preferably of substantially the same temperature as the sirup, in order to avoid a too sudden transition. In treating the solidified sugar as first described, the melting may be effected before the addition of water, in which case also the water, when added thereto, should be of about the same temperature as the melted mass. The melting liquefaction of the sugar is preferably effected at a temperature of, say, 150° to 180° Fahrenheit.

In the use of a centrifugal drier for the separation of the water and impurities from the crystallized sugar, additional quantities of water with or without bleaching or other agencies may be poured upon the sugar, as commonly practiced in the manufacture or cleansing of other sugars, and if the melting process is arrested and the liquid set aside to cool before becoming entirely clear, or while very fine particles of sugar remain undissolved, the presence of the latter greatly hastens the subsequent crystallization.

Material advantages of my improved process are found in its cheapness and brevity. The melting is effected in a few minutes, and the cooling and crystallization are accomplished in from twelve to forty-eight hours in an ordinary atmospheric temperature, or without the expense of high artificial heat.

I am acquainted with the Patents Nos. 250,333 and 250,334, granted December 6, 1881, to Arno Behr, the latter being for a "method of refining grape-sugar," and the former for a "process of manufacturing crystallized anhydride of grape-sugar from a watery solution of grape-sugar." In the Patent No. 250,334 is described a method of refining and crystallizing grape-sugar by mixing crystallized anhydride of grape-sugar or anhydrous grape-sugar with a watery solution of such sugar under certain specified conditions of concentration and temperature. The solution described in said Behr patent differs essentially from that herein contemplated in being a concentrated solution, while that herein set forth is, on the other hand, dilute. Said last-mentioned patent also depends upon the addition of crystallized anhydride of grape-sugar to effect the crystallization in such concentrated solution, while in this invention no addition is made of previously-crystallized sugar in any form whatever. In the Behr Patent No. 250,333 an essential condition of the process therein described is that the grape-sugar operated upon shall be of great purity, containing upward of ninety-five per cent. of pure grape-sugar in one hundred parts of dry substance. The watery solution therein described is also, as in the former case, a concentrated solution, the amount of water contained in the same being only about fifteen per cent. Neither of these conditions is present in this invention, which, as before stated, contemplated the addition of five per cent. or upward of water to the sugar, which already contains from, say, fifteen to twenty per cent., so that the solution is not concentrated as described in said patent. Such concentration is, in fact, specially provided against by conducting the operation of melting, or by forming the emulsion at a temperature below the boiling or evaporating point. This invention also does not depend upon a high degree of previous refinement of the sugar operated upon, as described in said Behr patent, being practically independent of quality in the sugar to be treated, which latter may be as low as sixty per cent. of purity. In the last-mentioned Behr patent it is also made a condition of the invention therein described that the temperature for cooling the concentrated solution shall be maintained at about 100° Fahrenheit. In my invention, on the other hand, the crystallization is effected more advantageously in proportion as the temperature is low, to the limit of, say, 40° to 60° Fahrenheit, while it is practicable at a temperature only just above the freezing-point.

The effects obtained from adding a quantity of water to a mass of melted grape-sugar or to a concentrated watery solution thereof at a temperature below the boiling-point, as above described, and of setting this dilute solution for crystallization and separation, are entirely unlike those obtained from a concentrated solution maintained at a high temperature, for the reason that in such concentrated solution produced by boiling the water and sugar are in a sense chemically combined and thoroughly incorporated with each other, while by the addition of water to such solution, or to a corresponding mass of melted sugar at a temperature below the boiling-point, the water and sugar are merely in mechanical juxtaposition, forming what is above called more properly an "emulsion," in which the water is more free to exert its affinities with the imperfectly-converted sugar, gluten, and other impurities, and also to form a medium within which the crystallizable sugar may circulate to form itself into crystals.

The essential character of the difference between Behr's highly-concentrated watery solution and my dilute emulsion will be more readily apparent by reference to the object which Behr has in view in maintaining the high degree of temperature for crystallization specified by him. This object is said to be in order to prevent the mass from becoming viscous instead of crystallizing. By my method of forming a dilute watery solution instead of a concentrated solution the necessary fluidity for the purpose of crystallization is obtained from the excess of water present, and is not therefore dependent upon a high temperature, such as Behr finds it necessary to maintain. It may here be added that a more perfect purification is effected in consequence of the presence of this excess of water, and that the process of crystallization is much more rapid in a low than in a high temperature, so that by first forming a dilute emulsion instead of a concentrated solution the time for crystallization is materially shortened, and the quality of the product is sensibly improved.

I am also well acquainted with the patent granted to Arno Behr April 18, 1882, No. 256,622, as an improvement upon the invention set forth in the Patent No. 250,333, above mentioned. In the Patent No. 256,622 essentially the same conditions are present—namely, a high concentration of the watery solution, a high degree of purity in the sugar before treated, and a high temperature in which the crystallization is effected. To these is added the condition that the time required for perfect crystallization covers a period of from one to two weeks. It is readily apparent that this is not my invention, which requires no such degree of purity in the sugar treated, which does not contemplate a high concentration, (but dilution,) which does not require the high temperature specified by Behr for crystallization, and in which but one or two days, instead of one or two weeks, is sufficient to accomplish perfect crystallization.

I am also acquainted with the Letters Patent No. 256,623, granted to Arno Behr, being an improvement on the same former patent above mentioned. In Behr's last-mentioned improvement the process consists in producing a coarse crystallization of anhydrous grape-sugar by subjecting a concentrated watery solution of grape-sugar to a temperature of about 90° Fahrenheit, for a sufficient period of time to effect complete cyrstallization, and in then crushing the crystallized mass. Behr's said improvement therefore contemplates the same high concentration of the watery solution and the same high temperature for crystallization, neither of which is a condition of my invention. I distinctly disclaim said alleged inventions of Behr, and I also disclaim, as not being my invention, the crushing of sugar after it is crystallized, which is made a condition of Behr's last above-mentioned process. My invention is obviously distinguished from the mere washing out of the solidified or granulated sugar.

I claim as my invention—

1. The method of treating grape-sugar which consists in forming a dilute emulsion by adding five per cent. or upward of water to the liquid or liquefied sugar at a temperature below the boiling-point of water, then allowing the mass to stand in an atmosphere of low temperature until crystallization is accomplished, and thereafter separating the liquid portion from the crystallized portion of the mass, substantially as described, and for the purposes set forth.

2. The method of treating solidified grape-sugar which consists in melting the sugar but arresting the melting process before complete dissolution, adding a quantity of water thereto at a temperature below the boiling-point, either before or after the sugar is melted, so as to form a dilute emulsion, then allowing the liquid mass to stand until crystallization of the crystallizable portion thereof is effected and thereafter separating the liquid part of the mass from the solid or crystallized portion, substantially as described.

In testimony that I claim the foregoing as my invention I affix my signature in presence of two witnesses.

WILLIAM ROBINSON.

Witnesses:
M. E. DAYTON,
JESSE COX, Jr.